March 6, 1951  R. D. WASSERMAN  2,544,000
COATED WELDING ROD
Filed May 5, 1949
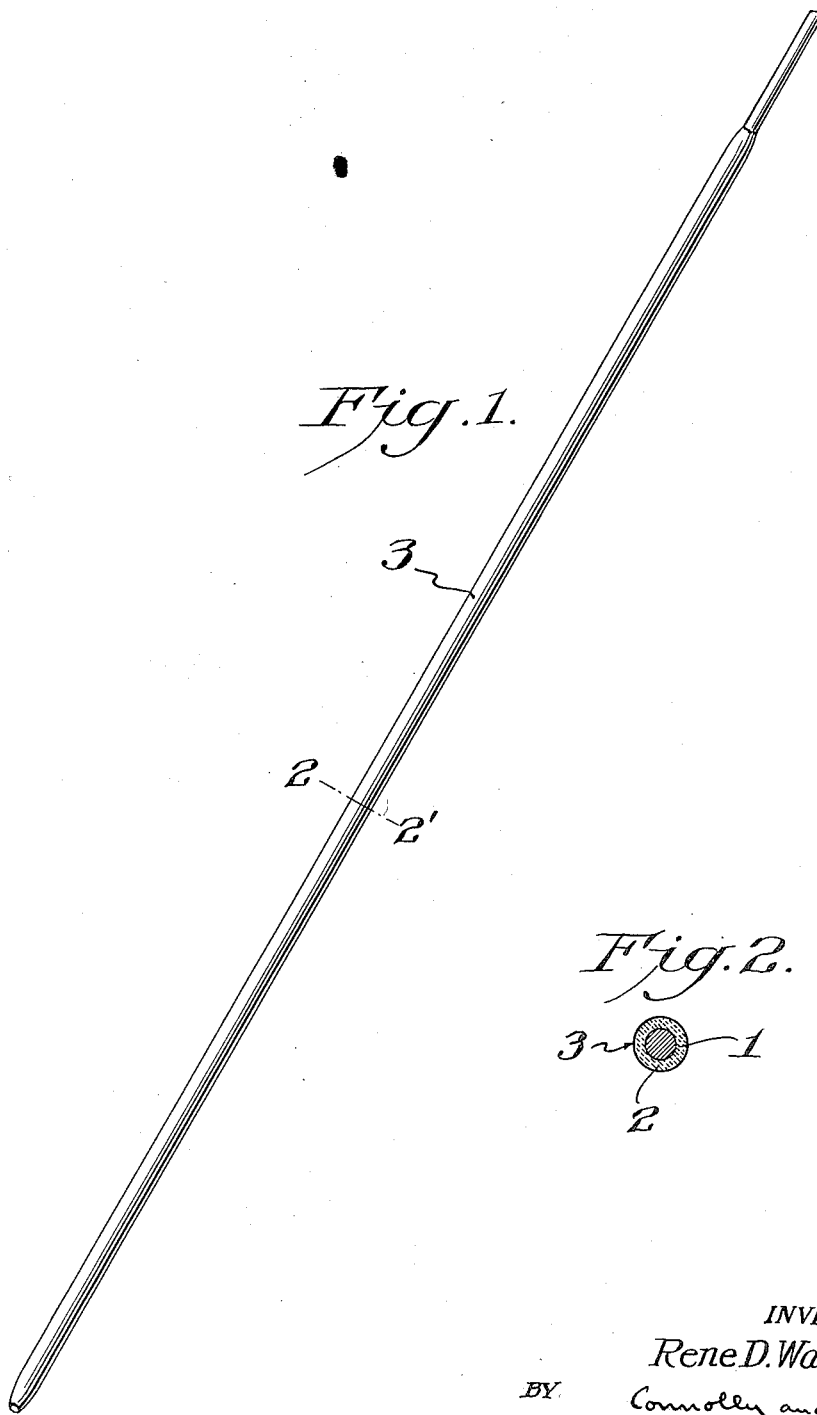
INVENTOR
Rene D. Wasserman
BY Connolly and Hutz
HIS ATTORNEYS Patented Mar. 6, 1951

2,544,000

UNITED STATES PATENT OFFICE 2,544,000

COATED WELDING ROD

Rene D. Wasserman, Stamford, Conn.

Application May 5, 1949, Serial No. 91,548

6 Claims. (Cl. 219—8)

My invention relates to improvements in coated welding rods. It is particularly concerned with flux coated welding rods bearing a continuous external film of metal or of metal powder and a suitable binder.

An object of my invention is to preserve and to protect the flux coating upon the welding rod against loss of moisture and abrasion due to handling. Another object is to provide a source of additional metal to supplement one or more components of the welding alloy or to compensate for the losses in such component or components, that may occur during the welding process. A further object, in the case of flux coated electrodes for arc welding, is to minimize spattering and consequent loss of metal. Additional objects and advantages of my invention will become apparent as the description proceeds.

Flux coated electrodes have long been known and are widely used for arc welding. More recently there have been developed flux coated rods for use in gas welding, and these are attaining increasing importance. The flux coatings are generally applied to the metal core in the form of a paste and, after the usual drying, should still contain from about 0.5% to about 7.5%, preferably from 2 to 5%, by weight of moisture. These coatings have little resistance to shock or abrasion, so that they may easily be damaged in handling of the rods. The fragility of the coatings increases, if their moisture content falls substantially below or increases substantially above the optimum range just indicated.

In many welding processes small amounts of one or more components of the core metal alloy may be lost due to vaporization, oxidation, etc. It is frequently difficult or even impossible to obtain a core metal alloy that will provide a filler metal alloy of precisely the desired composition. In many cases it is more economical to supply minor quantities of certain components to the filler metal alloy from a source other than a core metal alloy. It is difficult to insure that these will be added in just the right proportions.

I have discovered that the above mentioned drawbacks of the ordinary flux coated welding rods may be minimized, if not entirely avoided, by applying to the flux coating a continuous film of metal or of metal powder and a suitable binder. This metallic film serves to protect the flux coating against shock and abrasion and to maintain its optimum moisture content during shipment and storage. At the same time, the metal contained in this film will serve to compensate for metal losses during the welding process or to introduce additional components to the filler metal alloy. If a metal powder and binder are used, the binder may serve as a source of protective gases during the welding procedure.

While applicable generally to all types of flux coated welding rods, my invention is of particular advantage when applied to welding electrodes for arc welding. In the case of such welding electrodes, certain additional advantages may be noted. Thus, the novel, external, continuous, metallic film greatly reduces the disagreeable spattering of molten metal and flux that invariably accompanies the arc welding process. It provides an additional path for the electric current and permits the use of greater amperages without overheating of the flux coating. Furthermore, it makes unnecessary the usual step of brushing off the flux coating at one end of the electrode to provide direct contact between the holder and the metal core.

The metals that may be used in the continuous, external film may be varied widely depending upon the particular type of rod and the process for which it is intended. Generally speaking, the metal is one that is resistant to oxidation, corrosion and other atmospheric influences. The word "metal" is used in a broad sense and includes alloys, as well as the pure metals. In the case of electrodes for arc welding, I prefer to employ the highly conductive metals, in order that they may assist materially in carrying the current. Silver, aluminum, copper, zinc, tin and their alloys are the metals most commonly employed.

The metallic film may be applied to the flux coated welding rod in a variety of ways. If a film of metal only (without binder) is desired, the most convenient method is to apply it by means of a spray of molten metal according to well-known procedures. Suitable spray guns are available for this purpose and will form a continuous film of metal of the desired thickness. It is also possible to form the metal film by electroplating or by dipping in molten metal, if proper precautions are observed to prevent damage to the flux coating.

A film of metal powder and binder may be applied by dipping, brushing or spraying in the usual fashion with a coating composition containing a volatile solvent for the binder, in order to obtain the proper consistency. Suitable metallic lacquers and thinners are available on the market. The mixture of metal powder and binder can also be applied by extrusion. In the case of thermoplastic resins, the volatile solvent may be dispensed with at elevated temperatures. The binder is generally a synthetic resinous material, preferably a cellulose derivative such as cellulose acetate.

For obvious reasons one should avoid use of a highly inflammable binder or one that will develop obnoxious gases, when exposed to the welding temperatures. The proportion of metal powder to binder may vary within wide limits, i. e., from about 5 to about 15 parts by weight of metal powder for each part by weight of binder. In most cases, particularly for application to flux coated electrodes, I prefer to employ a high proportion of metal powder, using just enough binder to insure sufficient adhesion and strength of the resultant film. The amount of thinner (volatile solvent) to be used in the coating composition depends entirely upon the consistency desired for the particular mode of application.

The thickness of the metallic film is of importance for obtaining optimum results. It must be thick enough to form a continuous, coherent film, in order to perform its protective and moisture retentive functions. On the other hand, a very heavy coating is undesirable, as it may introduce complications during the welding procedure. I prefer to employ metallic films between about one and about twenty one-thousandths of an inch in thickness. These are sufficient completely to seal the pores of the flux coatings and to preserve their optimum moisture content. At the same time they will exclude the atmosphere and thus prevent deterioration of the flux coating that might be caused by oxidation or corrosion or by the absorption of undesired gas contents of the air.

The metallic films employed according to my invention are remarkably effective in preventing damage to the flux coating by abrasion or shock during packaging, shipping or other handling. This is particularly important in the case of electrodes having a flux coating rich in graphite, because abrasion of such coatings generally results in loss of graphite particles and consequent "pitting" of the coating. Comparative tests have shown that the flux coatings protected by my metallic films will retain their original moisture content, even though exposed to a dry atmosphere for 48 hours at 220° F., whereas the unprotected coatings will lose from 25% to 50% of their original moisture content under such conditions.

My new coated electrodes are remarkably free from any spattering during the arc welding process. Furthermore, there is little tendency for portions of their flux coating to burst away from the core due to overheating. Ordinary flux coated electrodes will show a loss of from 1% to 2% of metal due to spattering. When powdered metal and a cellulosic binder are used, the binder will supply additional carbon dioxide gas to form a protective shield and to help stabilize the arc.

For some purposes the metallic film may be made up of several different coatings. Thus, it may be desirable to combine successive coatings with and without binder, and to employ different metals in the individual coatings that can be used to make up a film of the desired thickness. While it is generally advisable to cover the entire surface of the rod with the metallic film, many of the advantages of my invention may be gained by covering only a part of said surface.

My improved, flux coated welding rods are illustrated in the accompanying drawings in which Fig. 1 is a perspective view of a flux coated rod having a continuous, external, metallic film, and Fig. 2 is an enlarged cross section of such a rod along the line 2—2' in Fig. 1.

Referring particularly to Fig. 2, 1 represents the core of the rod which may be composed of any of the usual metals employed for gas or arc welding. A flux coating 2 is carried thereby, whose composition will depend upon the type of welding for which the rod is intended and to some extent upon the composition of the core. Generally speaking, the flux coating for a gas welding rod will be composed of a mixture of boron compounds, particularly borates, and alkali metal halides, particularly chlorides. For arc welding electrodes the flux coating usually contains alkali metal carbonates, ferro alloys, deoxidizers and scavengers. In both cases it is customary to employ an alkali metal silicate as a binder.

The external metallic film 3 preferably covers the entire flux coating. Ordinarily a portion of the flux coating is removed at one end of the rod leaving the metal core exposed to provide a better contact surface for the usual holder and to insure maximum conductivity in the case of the electrode. It is not necessary that the metallic film be likewise removed, so that it may cover the entire outer surface of the coated rod as indicated in Fig. 1.

In order to assist in a full understanding of my invention, the following examples are given, it being understood that my invention is not limited to the details set forth therein. These examples indicate the best mode I have devised for carrying out my invention.

*Example 1*

Upon a core of a nickel alloy, such as Monel metal, there is applied, as usual, one of the flux coatings particularly adapted for arc welding. This coating preferably contains alkaline earth metal carbonates, graphite, silicon, a heavy metal oxide, such as manganese dioxide, ferro alloys, and an alkali metal silicate as binder. The flux coating may be extruded upon the core, or it may be applied thereto by dipping into a paste having the consistency of sour cream. After this flux coating has been dried to an optimum moisture content of about 2 to 3%, a continuous film of an allow composed of 60 parts of copper and 40 parts of zinc or of 40 parts of silver, 40 parts of copper and 20 parts of zinc, is applied to the entire external surface by means of a molten spray using a metallizing gun. Spraying is continued until a metal film having an average thickness of about five one-thousandths of an inch is formed.

The resultant welding electrodes are particularly suited for the arc welding of cast iron. Owing to the external metal film, the flux coatings thereon will retain their optimum moisture content indefinitely and are remarkably resistant to abrasion and to shock. Practically no spattering of metal or bursting off of flux coating will occur, when they are used in arc welding.

*Example 2*

A flux coated welding electrode particularly adapted for the arc welding of bronze castings, copper tubing and the like may be prepared as follows:

A flux coating of the type referred to in the preceding example is applied to a core of Phosphor-bronze (copper-tin alloy containing a small amount of phosphorous as a deoxidizer). After this flux coating has been dried to the optimum moisture content, a continuous external film of copper, about three one-thousandths of an inch in thickness, is sprayed thereon by means of a metallizing gun. The resultant, flux coated and metal filmed electrode displays all of the advantages referred to in Example 1.

Instead of applying a film of pure copper, substantially the same results may be obtained by dipping the flux coated electrode in a cellulose acetate lacquer containing a high proportion of copper powder, for instance 10 parts by weight of copper powder for each part by weight of cellulose acetate. Upon evaporation of the customary volatile solvent, there should remain a film averaging about seven one-thousandths of an inch in thickness. If necessary, dipping and drying may be repeated. The binder content of the metallic film will assist in stabilizing the arc by supplying additional carbon dioxide gas during disintegration. The film is particularly effective in preventing loss of graphite particles and consequent "pitting" of the flux coating.

*Example 3*

Upon a core of a nickel-silver alloy containing about 47% of copper, 11% of nickel, less than 1% of a deoxidizer and the balance zinc, there is applied in one of the customary manners a coating of a flux containing alkali metal chlorides, alkali metal borates, a minor amount of silica, and the usual binder. When the flux coating has been dried to a moisture content of about 4 to 5%, a continuous metallic film of about four one-thousandths of an inch average thickness, composed of an alloy containing 60% copper and 40% zinc, is sprayed thereon with a metallizing gun. This metallic film protects and preserves the flux coating to a remarkable degree during shipment, storage and handling. The resultant rod is particularly suited for the gas welding of ferrous metals.

It will be apparent to those skilled in the art that the details set forth in the foregoing examples are subject to considerable variation within the scope of my general disclosure without departing from the spirit of my invention. I do not intend to be limited by such illustrative details beyond what is required by the terms of my claims.

I claim:

1. A flux coated welding rod bearing a continuous, external, metallic film having an average thickness between about one and about twenty one-thousandths of an inch.

2. A flux coated welding rod bearing a continuous, external film consisting of metal, said film having an average thickness between about one and about twenty one-thousandths of an inch.

3. A flux coated welding electrode bearing a continuous, external, metallic film having an average thickness between about one and about twenty one-thousandths of an inch, said flux coating containing a substantial amount of graphite particles.

4. A welding electrode comprising a metal core coated with a flux containing an alkaline earth metal carbonate, graphite, silicon and an alkali metal silicate binder, the moisture content of said flux coating being between about 0.5% and about 7.5% by weight, said flux coating bearing a continuous, external, conductive, metallic film having an average thickness between about one and about twenty one-thousandths of an inch.

5. A welding electrode as claimed in claim 4, wherein the metallic film is composed of a metal powder and a cellulosic binder.

6. A welding electrode as claimed in claim 4 wherein the metallic film is composed of an oxidation and corrosion resistant metal selected from the group consisting of copper and its alloys.

RENE DAVID WASSERMAN.

REFERENCES CITED

The following references are of record in the file of this patent:

UNITED STATES PATENTS

| Number | Name | Date |
| --- | --- | --- |
| 1,324,227 | Carpenter | Dec. 9, 1919 |
| 1,525,840 | Weed | Feb. 10, 1925 |
| 1,709,474 | Hawley | Apr. 16, 1929 |